United States Patent [19]

Engel et al.

[11] 3,852,642

[45] Dec. 3, 1974

[54] SENSING AMPLIFIER AND TRIP CIRCUIT PARTICULARLY FOR GROUND FAULT CIRCUIT INTERRUPTER

[75] Inventors: Joseph C. Engel; Robert T. Elms, both of Monroeville, Pa.; John J. Misencik, Shelton, Conn.

[73] Assignee: Westinghouse Electric Corporation, Pittsburgh, Pa.

[22] Filed: Nov. 1, 1972

[21] Appl. No.: 302,949

[52] U.S. Cl. .............................. 317/18 D, 317/33 R

[51] Int. Cl. .............................................. H02h 3/28

[58] Field of Search .................. 317/18 D, 27 R, 52; 330/69, 199

[56] References Cited

UNITED STATES PATENTS

| | | | |
|---|---|---|---|
| 3,213,321 | 10/1965 | Dalziel | 317/18 D |
| 3,407,337 | 10/1968 | Benham | 317/18 D |
| 3,550,030 | 12/1970 | Blanyer | 330/199 |
| 3,621,334 | 11/1971 | Burns | 317/18 D |
| 3,673,502 | 6/1972 | Swain | 330/69 |
| 3,683,208 | 8/1972 | Burens | 307/296 |
| 3,700,966 | 10/1972 | Morrow | 317/18 D |

*Primary Examiner*—J. D. Miller
*Assistant Examiner*—Patrick R. Salce
*Attorney, Agent, or Firm*—G. H. Telfer

[57] ABSTRACT

Ground fault interrupter apparatus of the differential transformer type is provided with a sensing amplifier and trip circuit that includes an operational amplifier operated in a manner so that the interrupter apparatus is less sensitive to capacitive ground faults than it is to resistive ground faults. The quality of less sensitivity to capacitive ground faults is preferably obtained by applying to the operational amplifier a biasing voltage that is a half-wave rectified, unfiltered, voltage which aids in maintaining the inputs to the operational amplifier as a pure current source while using only a small number of components that is advantageous for reduced size.

24 Claims, 6 Drawing Figures

SENSING AMPLIFIER AND TRIP CIRCUIT PARTICULARLY FOR GROUND FAULT CIRCUIT INTERRUPTER

BACKGROUND OF THE INVENTION

This invention relates to amplifier circuitry and to ground fault interrupter apparatus of the differential transformer type with improved amplifier circuitry.

Various types of solid state circuitry have been used or proposed for use in the sense amplifier and trip circuit of a ground fault circuit interrupter of the differential transformer type. Reference may be made to copending application Ser. No. 158,338, filed June 30, 1971 by J. R. Reeves et al and assigned to the present assignee, now U.S. Pat. No. 3,736,468, May 29, 1973 for background with respect to other types of trip circuits.

The function of the same amplifier and trip circuit is basically to take the signal from the sensing winding of the differential current transformer and amplify it so that it can actuate a switching element (e.g., a switching transistor or thyristor) which in turn is operative (e.g., by causing a solenoid trip coil to be energized) to produce the opening of one of the conductors of the circuit when the sensed leakage current is at least of a predetermined level. False tripping should of course be avoided. Besides the required electrical characteristics a practical trip circuit must be suitable for compact, economical construction in order to permit it to be used in conjunction with conventional circuit breakers for widespread household use.

Ground fault interrupters should desirably be less sensitive to capacitive ground faults than to resistive ground faults. This is because leakage currents resulting from persons or animals completing the circuit to ground are highly resistive yet many electrical distribution systems, for example underground distribution systems, have inherent capacitive leakages to ground of magnitudes that impose no hazard to personnel or equipment. In the past, it has not been readily possible to achieve a ground fault interrupter that discriminates between resistive and capacitive types of ground faults.

It was in an effort to provide an improved and miniaturized sensing amplifying trip circuit for ground fault interrupter apparatus that the present invention came about.

SUMMARY OF THE INVENTION

In accordance with this invention, ground fault interrupter apparatus of the differential transformer type is provided with a sensing amplifier and trip circuit that includes an operational amplifier operated in a manner so that the interrupter apparatus is less sensitive to capacitive ground faults than it is to resistive ground faults. The quality of less sensitivity to capacitive ground fault is preferably obtained by applying to the operational amplifier a biasing voltage that is periodically zero between the two bias points of the amplifier. This can be achieved by using a half wave rectified, unfiltered, voltage supply which aids in maintaining the inputs to the operational amplifier as a pure current source. Only a small number of components are required and the circuit is suitable for construction using known miniaturization techniques such as hybridization.

An operational amplifier is used with its two input terminals connected directly across the sensing winding of the current transformer. That is, no impedances need be connected between the winding and the amplifier inputs. Biasing voltage is applied to the operational amplifier from the line voltage which is half-wave rectified (e.g. by a single diode) and is not filtered as is normally the case in operational amplifier applications. The output of the operational amplifier includes a feedback resistor returning to the input and a capacitor in parallel with the feedback resistor selected to be of such a value that there is produced less sensitivity to capacitive grounds.

The output of the operational amplifier, when of sufficient magnitude and with appropriate time delay factors to minimize false tripping, operates a solid state switching device such as a thyristor which is in series with a circuit element such as the trip coil of a solenoid of a circuit breaker for effecting the opening of one or more of the conductors of the circuit.

The switching device or thyristor is also in series aiding relationship with the diode rectifier that provides the half-wave rectification of the biasing potential for the operational amplifier. This provides an additional benefit in that it improves the transient blocking capability of the thyristor.

DESCRIPTION OF THE PREFERRED EMBODIMENTS

Figure 1:
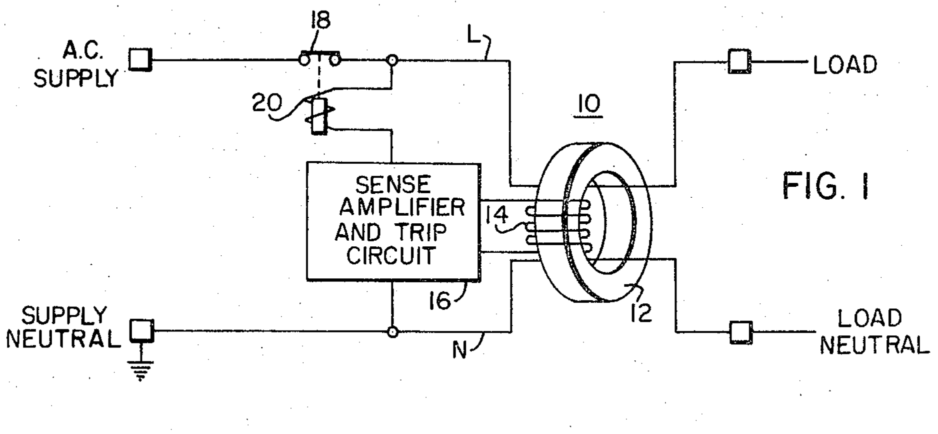
FIG. 1 is a generalized circuit schematic of ground fault circuit interrupter apparatus which may incorporate the present invention.

Referring to FIG. 1, ground fault interrupter apparatus of the differential transformer type is shown wherein a differential transformer 10 having a toroidal core 12 is provided with conductors, including a line conductor L and a neutral conductor N, extending through it as primary windings, each of a single turn although multiple turn windings may be used if desired. The primary conductors may be disposed in a coaxial arrangement if desired. A secondary sensing winding 14, usually of a plurality of turns, is also provided on the core 12 for sensing an imbalance in the conduction current levels of the primary conductors L and N that indicates the occurrence of a ground fault. The sensing coil 14 is connected to a sense amplifier and trip circuit 16 that is connected between the L and N conductors on the supply side of the differential transformer. The trip circuit 16 is responsive to the level of the sensed voltage on winding 14 in order to actuate a circuit breaker 18, through solenoid coil 20, on the line conductor to open the circuit upon the occurrence of a predetermined current imbalance between conductors L and N.

The circuit of FIG. 1 is merely exemplary of the environment in which the present invention may be practiced. This is a single phase two wire system, however other types of electrical systems may be similarly provided with ground fault interrupters in accordance with known practice.

Figure 2:
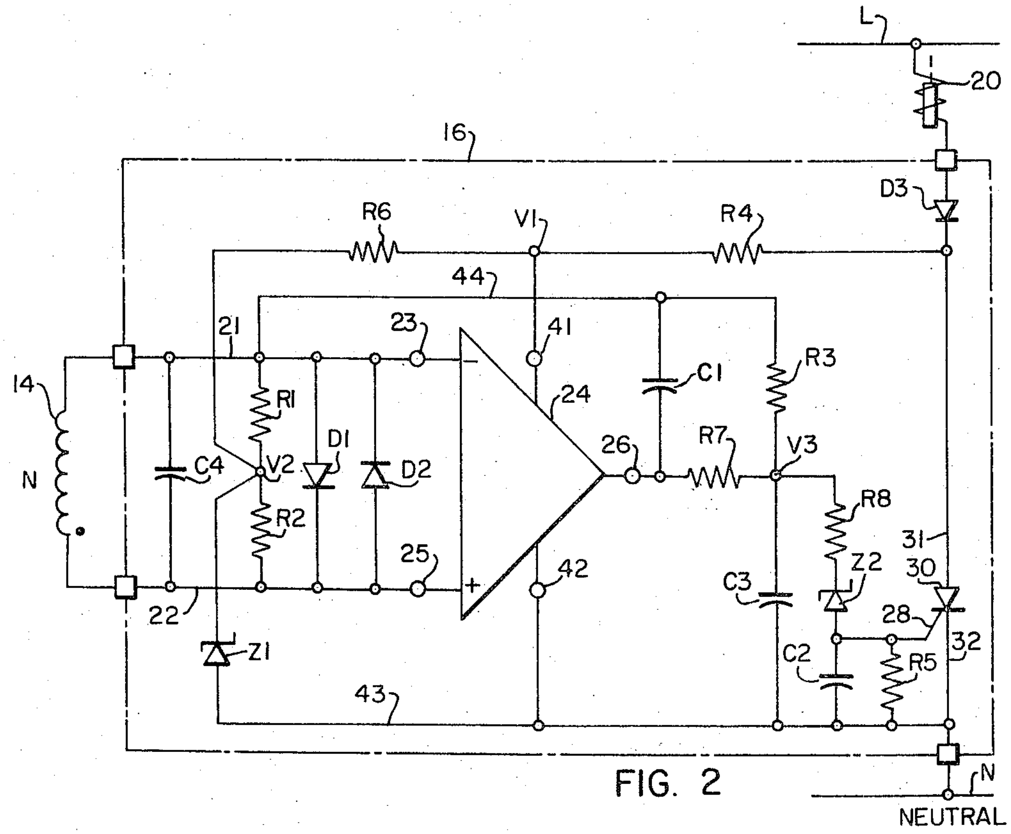
FIG. 2 is a circuit schematic of one embodiment of an amplifier and trip circuit in accordance with this invention.

Referring to FIG. 2, a sensing amplifier and trip circuit 16 in accordance with this invention is illustrated. The sensed signal, the current in the sensing winding 14 of the differential transformer, is applied to two lines 21 and 22 that are connected respectively directly to the negative and positive inputs 23 and 25 of an operational amplifier 24. The amplified output of the operational amplifier, at terminal 26, passes through resistors R7 and R8 and Zener diode Z2 to the gate electrode 28 of a thyristor 30 whose main terminals 31 and 32 are connected between the line and neutral conductors L and N of the system in series with the trip coil 20 of the circuit breaker.

The remaining circuit elements of FIG. 2 will be introduced in the course of the following description of the operation of the circuit. Assuming that at a given instance the potential of line conductor L is positive with respect to the neutral conductor N, bias current for the operational amplifier flows through a single diode rectifier D3 in series with coil 20 and thyristor 30, and also through resistors R4 and R6 to the reverse poled Zener diode Z1 which establishes the voltages V1, V2 and V3 at the indicated points, with respect to the neutral conductor.

Figure 3:
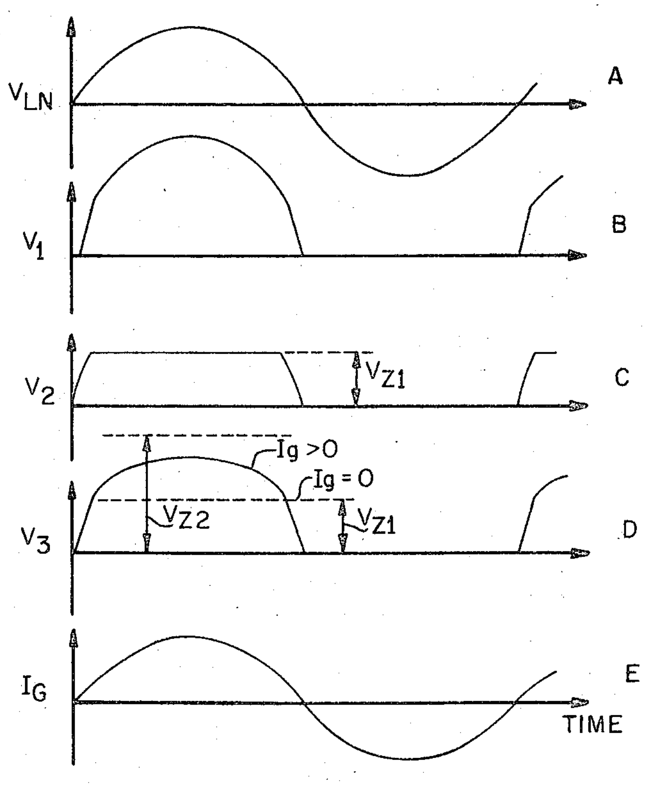
FIG. 3 is a set of waveforms illustrating the variation in certain electrical parameters at various points in the circuit.

Referring to FIG. 3, waveform A shows a cycle of line to neutral voltage. Waveforms B, C and D are, respectively, voltages V1, V2 and V3 and waveform E shows the sensed current, $I_g$, in winding 14. V1 in the line voltage after half-wave rectification by diode D3. V2 is the half-wave rectified voltage as limited by Zener diode Z1. V3 represents the form of the output of the operational amplifier 24.

If the sensed current $I_g$ is assumed to be zero, the output of the operational amplifier, voltage V3, will be essentially equal to voltage V2 as applied to its input. This assumes that the input bias currents for the operational amplifier produce a negligible differential voltage across resistors R1 and R2 that are connected between lines 21 and 22. The output voltage, V3, for $I_g$ = O, is therefore equal to the voltage of the Zener diode Z1, $V_{Z1}$. This voltage is less than the voltage of the Zener diode Z2, $Z_{Z2}$, in the thyristor gate circuit and thus the thyristor is biased off.

With a sensed current present, that is, $I_g$ is not zero, from the negative terminal 23 of the operational amplifier 24 so that there is a net output which is, as illustrated for voltage V3 in FIG. 3, in excess of the voltage across Z1 and which may or may not be in excess of the voltage across Z2. If and when the voltage across Z2 is exceeded, gate current can flow through resistor R8 and Z2 into electrode 28, turning on the thyristor 30. The surge through the trip coil 20 will energize the solenoid tripping the mechanically spring loaded breaker mechanism in opening the breaker contacts.

The nature of the supply voltage, V1, fed to the operational amplifier 24 at terminal 41 is important to the practice of the invention. In the past operational amplifiers have normally been operated with direct voltages (say + and −10 v.) applied to the positive and negative supply terminals 41 and 42, respectively. (For general background on operational amplifiers and their applications reference may be made to Burr-Brown Research Corporation Seminar Notes, 1971.) Primarily inspired by the desire to minimize components for the sake of miniaturization, thought was given to the possibility of avoiding the additional components necessary to provide full wave rectified and filtered supply voltages. A half-wave rectified, unfiltered, supply was chosen because it can be developed, for one side of the amplifier, by a single diode D3. It was also decided to maintain the other amplifier supply terminal 42 at a reference potential provided on line 43 by tying line 43 to neutral conductor N. In setting up the supply to points 41 and 42 in this manner, it was found possible to avoid impedances in lines 21 and 22 to the inputs 23 and 25 from the winding 14. Resistive impedances have been previously considered necessary in operational amplifier applications. Avoiding such impedances provides an additional advantage in terms of economy and miniaturization. Further consideration has indicated that the desired bias potentials on terminals 41 and 42 could be achieved by other than half-wave rectification so long as there is a differential potential between those two points that is periodically zero for an interval. Half-wave rectification of the voltage to one terminal is a convenient, and presently preferred, way to achieve the desired condition. Another way, for example, is to use an unfiltered full-wave rectified power supply which is designed to have a short period of zero potential each half cycle, that may be desirable in some instances for full wave sensing. By such means, a short reset time interval is provided that can be considered a time for clearing current out of winding 14.

Another feature of the circuit of FIG. 2 to be noted is that there is provided at the output of the operational amplifier a feedback network, or averaging network, comprising capacitor C1 and resistor R3 in parallel to line 44 and back to input line 21. The network of C1 and R3 is superficially similar to such networks as have previously been used in operational amplifier applications. Normally however those components C1 and R3 would be connected to a single point 26 at the amplifier output or, where a current limiting resistor such as R7 is used at the output, to a single point (such as that designated V3) on the outboard side of R7. It has been found, and is not presently fully understood, that the illustrated connections of C1, R3 and R7 are important to produce consistent operation. That is, one end of C1 should be connected directly to the output 26 of amplifier 24 and one end of R3 should be connected to the outboard side of R7.

The following table presents a description of components for the circuit of FIG. 2 that are presented by way of further example. This circuit has been made and successfully operated in ground fault interrupter apparatus that also incorporated a means for protection against the grounded neutral condition as described in copending application Ser. No. 218,771, filed Jan. 18, 1972, by K. R. Coley et al and assigned to the present assignee.

| Component | Identification |
|---|---|
| Operational amplifier 24 | Commercially available Type 741 (for equivalent circuit refer to Motorola Semiconductor Products Inc. MC1741 data sheet, Apr. 1969) |
| Thyristor 30 | 600v, 1.5A |
| Resistors R1 and R2 | 15,000 ohms |

-Continued

| Component | Identification |
|---|---|
| (matched bias resistors) | |
| Resistor R3 | 2.7 megohms |
| Resistor R4 | 56,000 ohms |
| Resistor R5 | 2,400 ohms |
| Resistor R6 | 56,000 ohms |
| Resistor R7 | 4,700 ohms |
| Resistor R8 | 500 ohms |
| Capacitor C1 | 100 pf. |
| Capacitor C2 | 0.01 mf. |
| Capacitor C3 | 0.01 mf. |
| Capacitor C4 | 100 pf. |
| Zener diode Z1 | 8.2 v. |
| Zener diode Z2 | 18 v. |
| Diodes D1 and D2 | 50v, 1.5A |
| Diode D3 | 600v, 1.5A |

As is apparent, D1 and D2 limit the voltage at the operational amplifier inputs to the diode forward voltage drop of about 0.7 v. Various RC combinations (C4, R1, R2; C1, R3; C3, R7; and C2, R5) provide filtering action for transient or noise suppression that minimize false responses. In actual operation over wide temperature ranges (−35° C to +80° C) the circuit has been found to trip consistently upon the occurrence of a resistive ground fault of approximately 3 ma. but in the case of a capacitive ground fault a current in excess of 4.5 ma is required to trip. This desirable characteristic of reduced sensitivity to harmless capacitive ground faults is achieved by means of the integration or averaging effect produced by feedback capacitor C1 in combination with the period of zero bias potential each cycle which causes the voltage potential of C1 to be reset to zero at the beginning of each half cycle. Resistive ground currents are positive during the complete positive half cycle of the line voltage and thus the voltage across C1 starts at zero and reaches a maximum value near the end of the positive half cycle. Capacitive ground currents are positive during the early portion of the half cycle of line voltage and negative during the later portion of the half cycle. The voltage across C1 thus starts at zero and reaches a maximum value near the middle of the half cycle. This value approaches a value which is only one half that for a resistive ground current of the same amplitude thus causing the circuit to be less sensitive to capacitive ground currents.

The feature of reduced sensitivity to capacitive grounds can be provided by other means than a periodically zero bias potential on the operational amplifier. For example, even if the bias were for some reason from a fullwave rectified and filtered supply, a switching means such as a transistor could be provided across the capacitor C1 to provide means to reset it periodically in synchronism with the A.C. line voltage.

It is apparent from the foregoing description that the circuit has what may be referred to as "half-wave sensitivity," that is, a ground fault is detected only if it occurs while the line voltage on conductor L has a positive polarity, here plus. This is not a drawback in circuits tied to a conventional utility system because for any ground impedance (capacitive, resistive, inductive) the ground current will be positive for at least a portion of the positive half cycle of line voltage. Furthermore, half wave sensitivity means the chances for false tripping due to brief transients, e.g. lightning, are reduced by half.

Since a significant design objective of the circuit was miniaturization at reasonable cost, it is interesting to note that this sense amplifier and trip circuit has been successfully made, using known thick film hybridization techniques, in a ground fault interrupter that is combined with a circuit breaker all within a one inch wide circuit breaker housing. For information on such a GFI-breaker combination reference should be made to copending application Ser. No. 287,921, filed Sept. 11, 1972, by Coley and Misencik and assigned to the present assignee. As compared with known prior art amplifier and trip circuits, the one of this invention provides substantial reduction in bulk principally through the avoidance of a full wave rectifier bridge and large valued filter capacitors, usually of tantalum and likely to be the least long lived components in the circuit.

While the foregoing is believed adequately to disclose the invention, the following discussion is presented as a further aid for those wishing a more complete understanding of the manner of operation of the circuit of FIG. 2.

The output current of the current transformer is not simply $I_{g/N}$, where N is the number of turns of the sensing winding, because of the magnetizing current of the current transformer. This magnetizing current, which is proportional to the flux of the transformer, can be considered to flow in an imaginary inductance $L_M$ connected across winding 14. This representation is valid because the core flux, and thus the magnetizing current of the current transformer, is proportional to the integral of the secondary voltage.

Figure 4A:
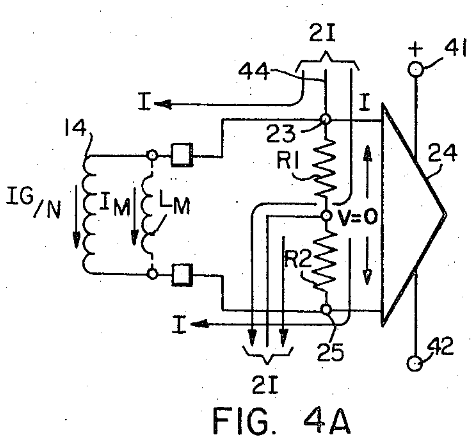
FIGS. 4A and 4B are simplified circuit schematics of part of the circuit of FIG. 2 for different operating conditions.
Figure 4B:
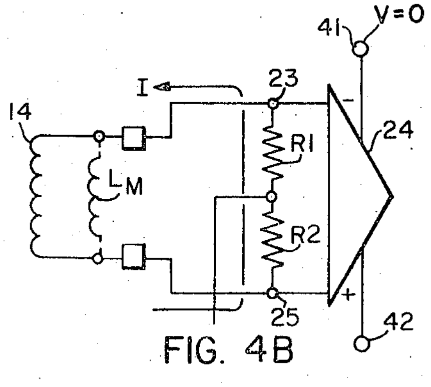

Referring to FIGS. 4A and 4B, the actual output current I of the current transformer to the amplifier 24 can be determined for various conditions with a resistive ground on the line conductor L. If the line voltage is positive, the amplifier is normally biased and the input circuit appears as shown in FIG. 4A. The operational amplifier input voltage will be zero and thus the voltage drop across resistor R2 must equal that across R1. If R1 equals R2 it follows that the current, I, must flow in R1 as well as R2 and thus the feedback current of the operational amplifier on line 44 is actually twice the current transformer output current. With the current transformer shunted by a virtual short presented by the operational amplifier 24, the magnetizing current $I_M$ cannot change. The output current of the current transformer is thus $I_{g/N}$ plus a constant magnetizing current $I_M$.

Figure 5:
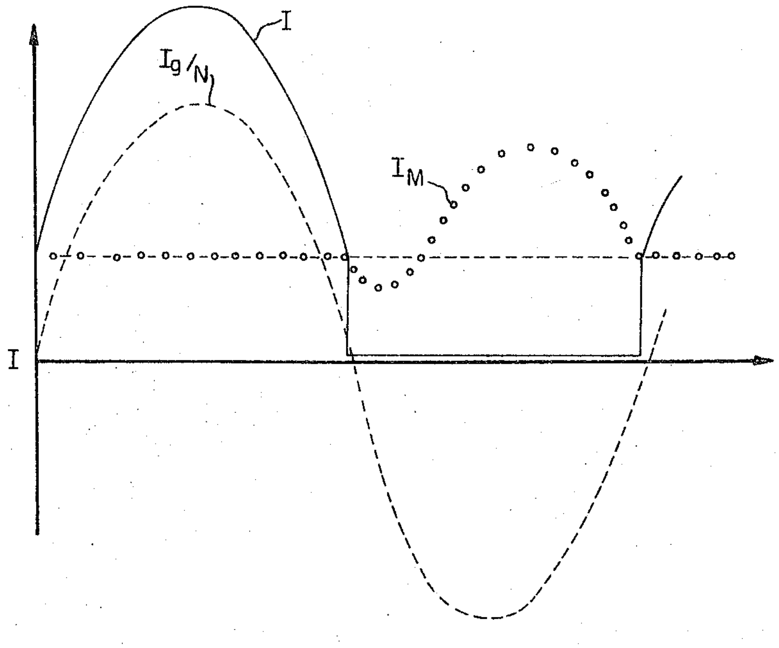
FIG. 5 is a graph of waveforms useful in the understanding of FIGS. 4A and 4B.

During the preceding negative half cycle of the line voltage when the operational amplifier is not biased the input circuit appears as shown in FIG. 4B. During this time the input circuit current can thus flow into two parallel paths formed by $L_M$ in parallel with the series connected combination of R1 and R2. The resulting current transformer output waveform can be calculated by the usual methods of transient circuit analysis realizing that for steady state operation that the initial and final value of I during the half cycle must be the total output current. FIG. 5 illustrates waveforms for this total current over a cycle.

We claim:

1. Electronic apparatus comprising: a source of sensed signals; amplifier means receiving sensed signals directly from said source; means to supply to said amplifier means an operating supply that is a half-wave rectified voltage; and a sold state switching device responsive to a predetermined output of said amplifier means to result in a change of conductive state.

2. The subject matter of claim 1 wherein: said source of sensed signals in a sensing coil of a differential current transformer; said amplifier means is an operational amplifier having a pair of input terminals to which said sensed signals are applied, a pair of bias terminals to one of which said half-wave rectified voltage is supplied while the other of said bias terminals is at a relatively fixed potential, and an output terminal; and said solid state switching device is a thyristor having a pair of main terminals connected in series with a circuit element to be actuated when a highly conductive current path exists between said main terminals said thyristor also having a control terminal operatively connected to said output terminal of said operational amplifier to be responsive to predetermined magnitude output signals thereof.

3. The subject matter of claim 2 wherein: said means to supply an operating supply to said amplifier comprises an A.C. source and a diode rectifier; said thyristor is connected by said main terminals in series aiding direction with said diode rectifier.

4. Ground fault interrupter-apparatus comprising: a differential current transformer including a magnetic core, a plurality of primary windings on said core, each being one of the line and neutral conductors of an A.C. electrical distribution system, and a secondary sensing winding on said core for sensing current unbalance between said primary windings; means responsive to a predetermined sensed signal on said sensing winding to result in opening of said line conductor, said means comprising amplifier means having inputs connected directly to the two ends of said sensing winding, bias means for said amplifier means comprising means to supply between two bias terminals of said amplifier means a potential difference that is periodically zero, and a solid state switching device responsive to a predetermined output of said amplifier means to energize a trip coil of a circuit breaker.

5. The subject matter of claim 4 wherein: said amplifier means is an operational amplifier and said solid state switching device is a thyristor.

6. An operating circuit of an operational amplifier comprising: a sensing coil of a differential transformer connected across first and second input terminals of the operational amplifier; means to supply a bias potential to first and second bias terminals of the operational amplifier, said bias potential between said bias terminals being periodically zero for an interval; and an averaging network, comprising an energy storage means, connected between an output terminal of the operational amplifier and one of said input terminals.

7. The subject matter of claim 6 wherein: said sensing coil is directly connected to said input terminals; said means to supply a bias potential comprises an alternating current supply comprising line and neutral conductors, said first bias terminal is connected to said line conductor with a half-wave rectifier therebetween and said second bias terminal is connected to said neutral conductor; and said energy storage means of said averaging network is a capacitor that is reset to zero charge during the interval in which said potential is zero.

8. The subject matter of claim 7 wherein: one side of said capacitor is directly connected to said output terminal and the other side of said capacitor is directly connected to said input terminal; said averaging network also comprising a first resistive impedance in parallel with said capacitor.

9. The subject matter of claim 8 wherein: a single series connection between said line and neutral conductors comprises a solenoid coil, said half wave rectifier and a solid state switching device; said solid state switching device having a control terminal connected to the output terminal of said operational amplifier through at least a second resistive impedance which is connected between said capacitor and said first resistive impedance.

10. An operating circuit of an operational amplifier in a sense amplifier and trip circuit of a ground fault interrupter for an alternating current systems comprising: means to supply sensed signals to be amplified to first and second input terminals of said operational amplifier; means to supply a bias potential to first and second bias terminals of the operational amplifier; and an averaging network, comprising an energy storage means, connected between an output terminal of the operational amplifier and one of said input terminals; and means to reset said energy storage means to zero periodically in synchronism with the line voltage of the alternating current system.

11. The subject matter of claim 10 wherein: said means to reset said energy storage means is provided by said means for supplying potential to said bias terminals being a bias potential that is periodically zero for an interval sufficient to permit said energy storage means to reset.

12. Ground fault interrupter apparatus, exhibiting reduced sensitivity to capacitive ground faults as compared with resistive ground faults and suitable for economical and compact fabrication, comprising:

a differential current transformer having a magnetic core for association with primary windings that are conductors of an electrical system to be protected by the apparatus and also having a sensing element for sensing current unbalance between the primary windings;

an amplifier having at least one input terminal connected with said sensing element;

bias supply means for supplying to said amplifier a bias potential that is periodically zero.

13. Ground fault interrupter apparatus in accordance with claim 12 wherein:

said bias supply means comprises a rectifier for half-wave rectifying AC line voltage and the half-wave rectified potential produced by said rectifier is supplied to said amplifier free of filtering.

14. Ground fault interrupter apparatus in accordance with claim 12 wherein:

said sensing element has a pair of output terminals; and said amplifier has a pair of input terminals connected respectively to said output terminals of said sensing element.

15. Ground fault interrupter apparatus in accordance with claim 14 wherein:

said sensing element is a sensing coil wound on said core.

16. Ground fault interrupter apparatus in accordance with claim 14 wherein:

said input terminals of said amplifier and said output terminals of said sensing element are directly conductively connected without any appreciable impedance therebetween.

17. Ground fault interrupter apparatus in accordance with claim 14 wherein:

said amplifier input terminals include an inverting input terminal and a non-inverting input terminal;

said amplifier further having a pair of bias terminals, one of said bias terminals being maintained at a reference potential level, the other of said bias terminals being supplied from said bias supply means with potential that is periodically at said reference potential level.

18. Ground fault interrupter apparatus in accordance with claim 17, wherein:

said amplifier has an output terminal;

a feedback network is connected between said output terminal of said amplifier and one of said input terminals of said amplifier, said feedback network comprising a capacitor that is reset to zero charge when said bias potential is zero.

19. Ground fault interrupter apparatus in accordance with claim 13 wherein:

said amplifier has an output terminal; and a solid state switch is provided having a control terminal connected with said output terminal of said amplifier.

20. Ground fault interrupter apparatus in accordance with claim 19 wherein:

said solid state switch is in a circuit branch connected between conductors of an electrical system to be protected by the apparatus in series with said rectifier and with a solenoid trip coil of a circuit breaker to be tripped upon occurrence of a ground fault.

21. Ground fault interrupter apparatus in accordance with claim 20 wherein:

said solid state switch has a rectifying characteristic and is in said circuit branch in series aiding direction with said rectifier.

22. Electronic apparatus comprising:

an amplifier having a pair of input terminals, an output terminal, and a pair of bias terminals;

a source of sensed signals connected across said pair of input terminals;

a source of bias potential connected to one of said bias terminals, said source of bias potential supplying a potential that is periodically zero.

23. The subject matter of claim 22 wherein: the other of said bias terminals is maintained at a reference zero potential.

24. The subject matter of claim 22 wherein: said source of sensed signals is connected directly to said input terminals with no appreciable impedance therebetween.

* * * * *

UNITED STATES PATENT AND TRADEMARK OFFICE

CERTIFICATE OF CORRECTION

PATENT NO. : 3,852,642
DATED : December 3, 1974
INVENTOR(S) : Joseph C. Engel et al It is certified that error appears in the above-identified patent and that said Letters Patent are hereby corrected as shown below:

Col. 1, line 19, delete "same" and substitute -- sense --.

Col. 3, line 34, delete "in", second occurrence, and substitute -- is --.

Col. 3, line 50, after "zero," insert -- a current flows --.

Claim 1, line 5, delete "sold" and substitute -- solid --.

Claim 2, line 2, delete "in" and substitute -- is --.

Claim 2, line 12, after "terminals" insert a comma.

Signed and Sealed this

*thirtieth* Day of *August 1977*

[SEAL]

*Attest:*

RUTH C. MASON
*Attesting Officer*

C. MARSHALL DANN
*Commissioner of Patents and Trademarks*